June 4, 1963

L. L. JAFFE ETAL 3,092,469

MIXER

Filed April 27, 1959

INVENTORS
Lawrence L. Jaffe
George N. Wetzel
BY
Edwin S. Dybvig
THEIR ATTORNEY

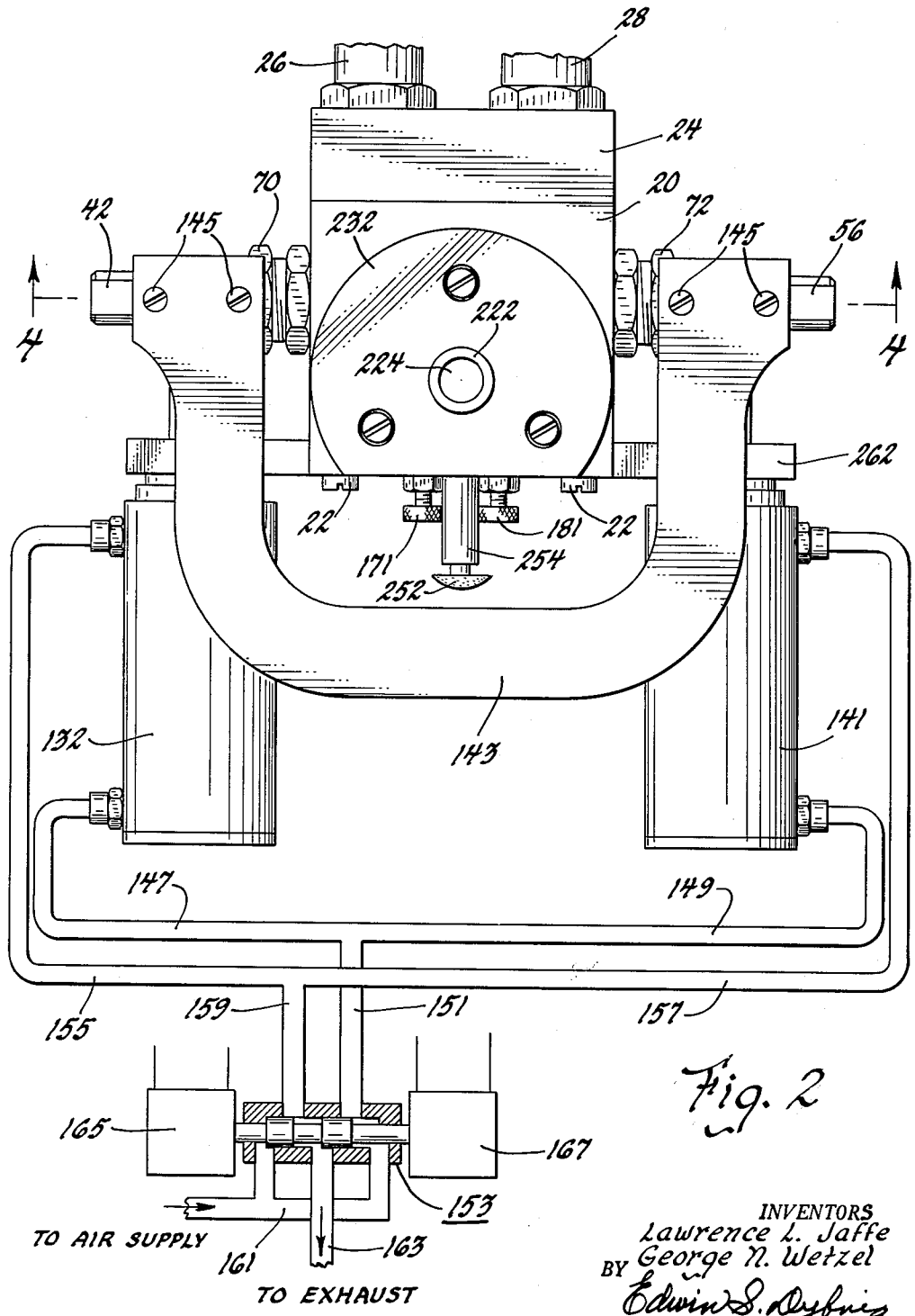

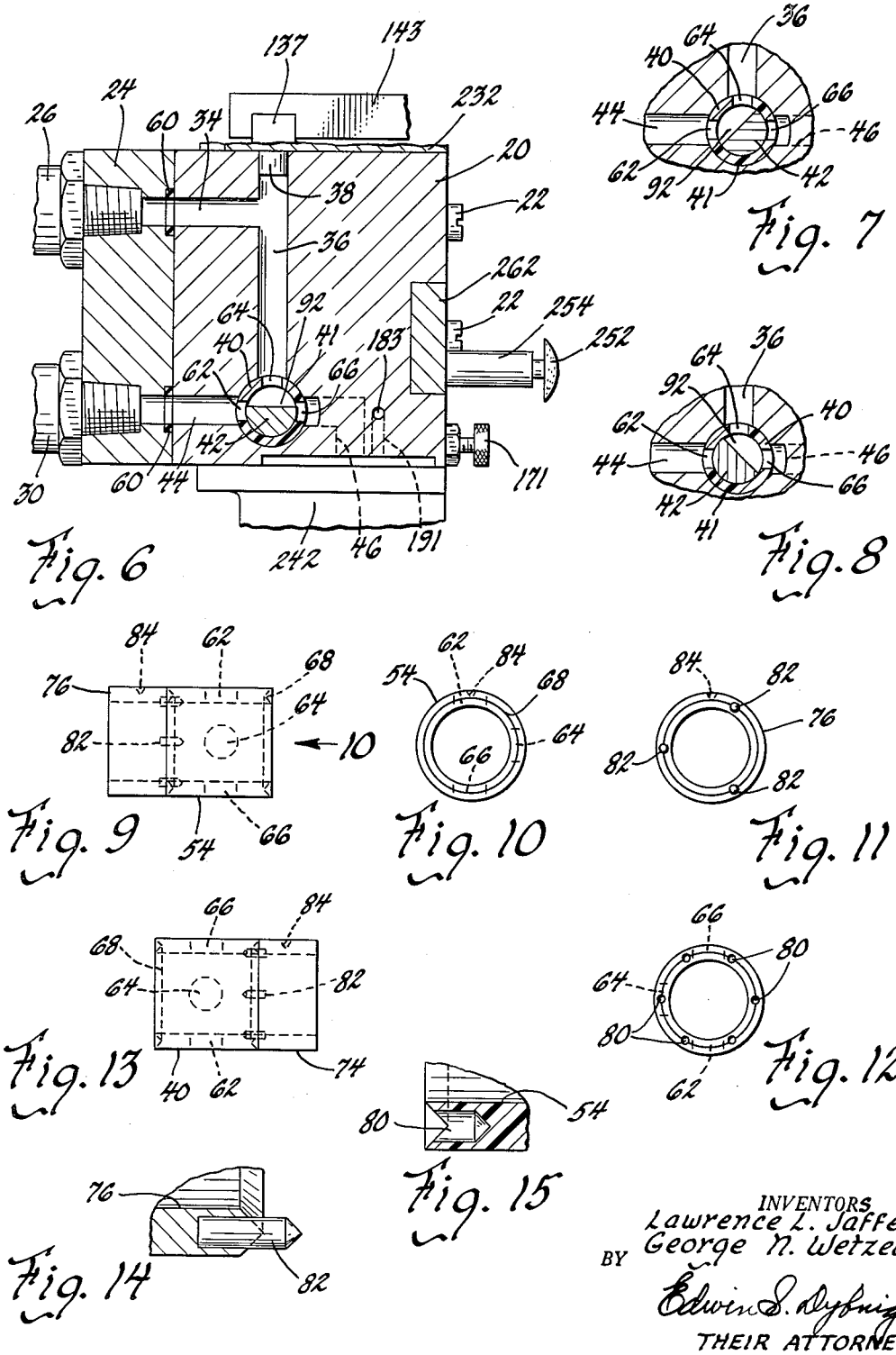

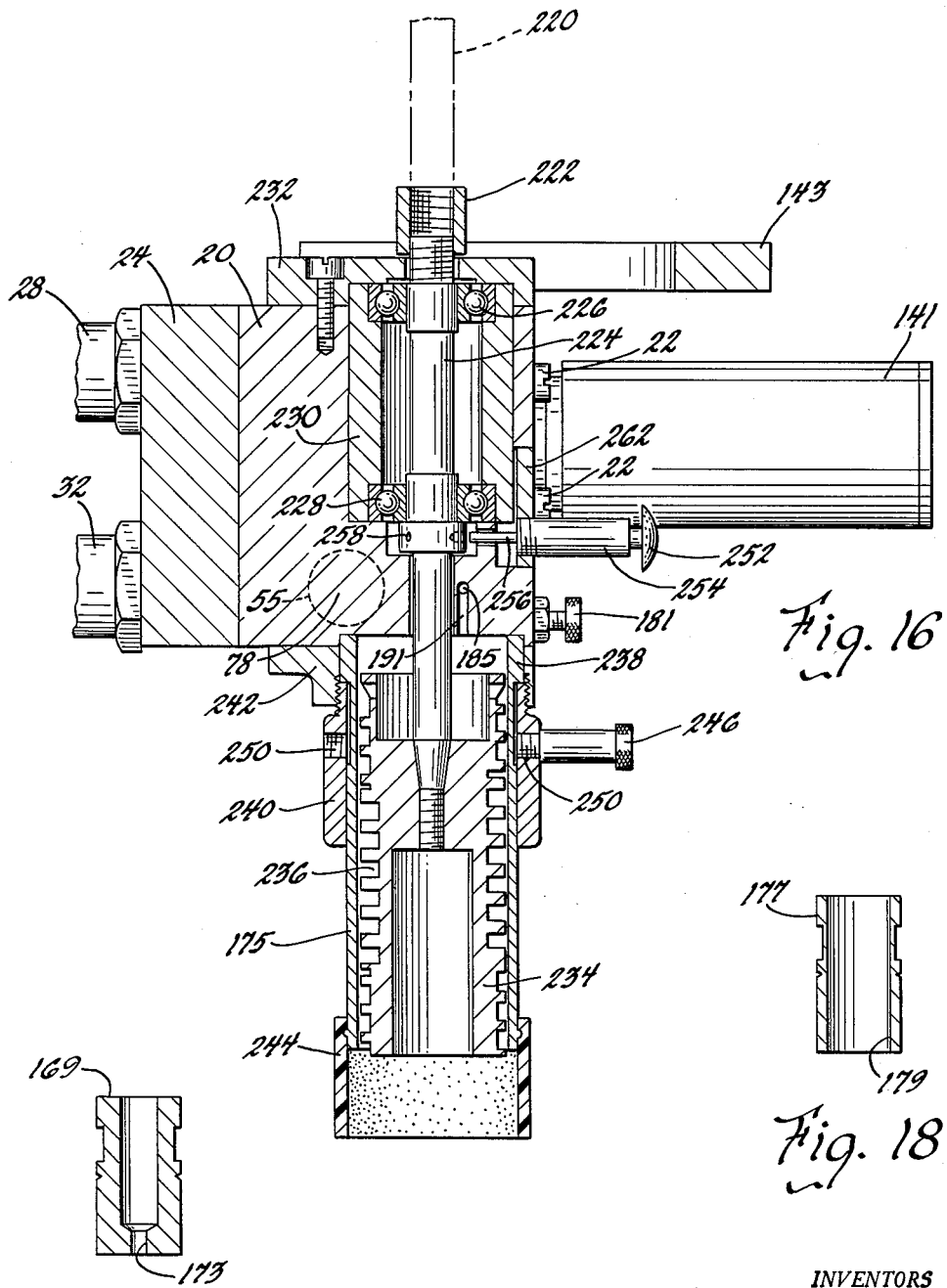

United States Patent Office 3,092,469
Patented June 4, 1963

3,092,469
MIXER
Lawrence L. Jaffe and George N. Wetzel, Dayton, Ohio, assignors to General Motors Corporation, Detroit, Mich., a corporation of Delaware
Filed Apr. 27, 1959, Ser. No. 809,051
3 Claims. (Cl. 23—285)

This invention relates to chemistry and more particularly to chemical mixing devices capable of mixing highly reactive fluids and supplying the fluid mixture.

Considerable difficulties have been encountered in chemical mixers when used for polyurethane foams. The materials are very reactive, and if not kept flowing after mixing, the reactive materials will clog the mechanism. The urethane materials are very adherent, and therefore, the cleaning of the mixer is difficult and is to be avoided as much as possible. Therefore, even the slightest leakage allowing intermixture of the components must be absolutely prevented. Any stoppage of flow through the mixing passages for more than a brief period requires that all the mixing components be completely removed and cleaned.

It is an object of this invention to provide a chemical mixer in which the leakage of one component into another is completely prevented.

It is another object of this invention to provide means for preventing damage to a chemical mixer if the mixed ingredients are allowed to remain in the mixing chamber too long.

It is another object of this invention to provide an arrangement for readily disassembling the mixer for removal of any mixed ingredients.

These and other objects are attained in the form shown in the drawings in which separate valve and valve shafts are provided for each reactive component, and a solid wall is provided between the two shafts to prevent any leakage of one component into another. The cylinder surrounding the mixing head is rotatably mounted and fastened by a gland nut in such a way that, should the components within the cylinder react sufficiently to lock the mixing head to the cylinder, the cylinder and gland nut will turn a limited amount to release the cylinder for free rotation to prevent damage to the mixing head and its drive mechanism. The fluid connections to the mixer are made by a quickly detachable face plate containing all four fluid connections. A spring lock is provided for locking the mixing head for ready removal. The proportioning orifices are also made readily removable.

Further objects and advantages of the present invention will be apparent from the following description, reference being had to the accompanying drawings wherein a preferred embodiment of the present invention is clearly shown.

In the drawings:

FIGURE 2 is a top view of the mixer shown in FIGURE 1 together with the air cylinder control system;

FIGURE 6 is a fragmentary vertical sectional view taken along the line 6—6 of FIGURE 4;

FIGURE 7 is a fragmentary sectional view corresponding to FIGURE 6 with the valves shown in closed position;

FIGURE 8 is a fragmentary vertical sectional view similar to FIGURES 6 and 7 with the valves shown in the open position;

FIGURE 9 is an enlarged view in elevation of the right bearing and valve cage shown in FIGURES 3, 4 and 6;

FIGURES 10 is a right side view of the valve cage shown in FIGURE 9;

FIGURE 11 is a right side view of the right bearing shown in FIGURES 3, 4 and 6;

FIGURE 12 is a left side view of the valve cage shown in FIGURE 9;

FIGURE 13 is an enlarged view in elevation of the left valve cage and bearing shown in FIGURES 3, 4 and 6;

FIGURE 14 is an enlarged fragmentary sectional view showing one of the orienting pins projecting from the bearing shown in FIGURE 9;

FIGURE 15 is an enlarged fragmentary sectional view showing one of the sockets in the valve cage shown in FIGURE 9 for receiving one of the projecting pins of the bearing shown in FIGURE 9;

FIGURE 16 is a vertical sectional view taken along the line 16—16 of FIGURE 1;

FIGURE 17 is a fragmentary vertical section of the left orifice bushing taken along the line 17 as illustrated in FIGURE 3; and FIGURE 18 is a similar sectional view of the right orifice bushing indicated by the line 18 on FIGURE 3.

Figure 1:
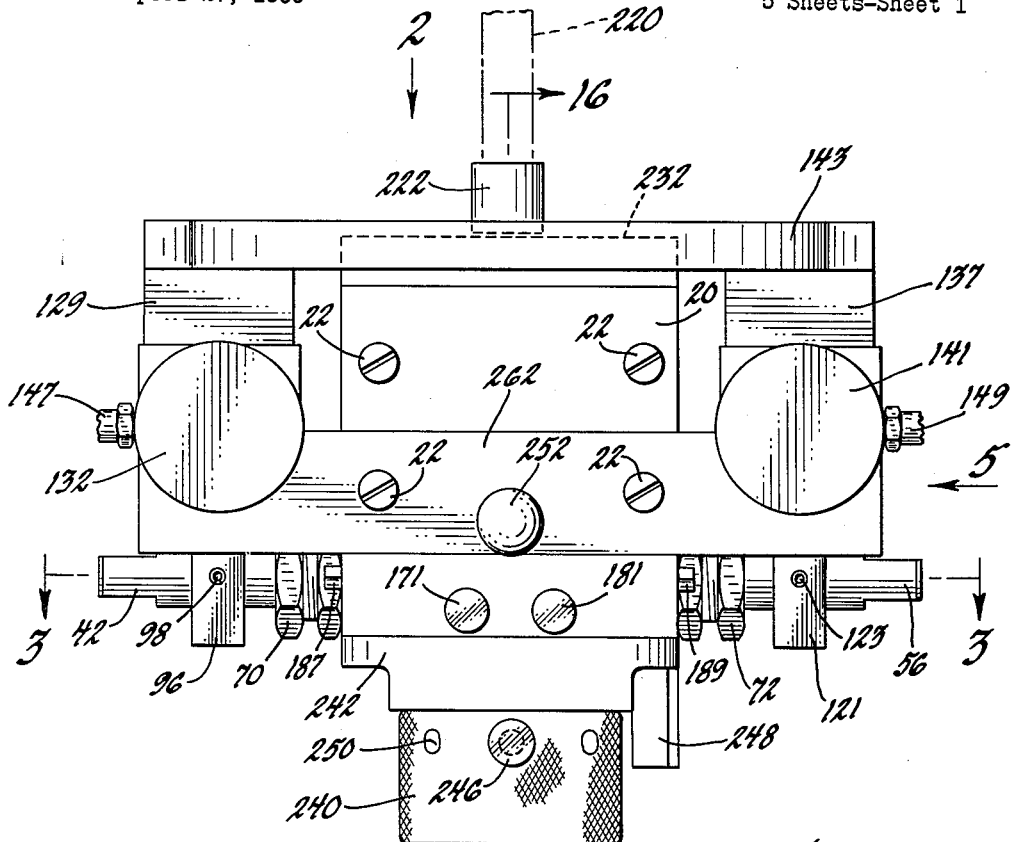
FIGURE 1 is a front view of a chemical fluid mixer embodying one form of my invention with the parts shown in the middle of movement between open and closed positions.
Figure 5:
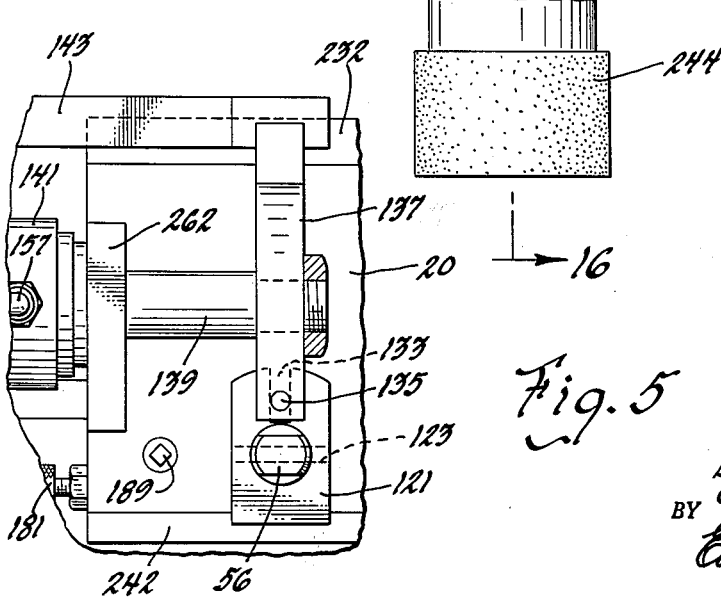
FIGURE 5 is a fragmentary right side view of FIGURE 1.
Figure 3:
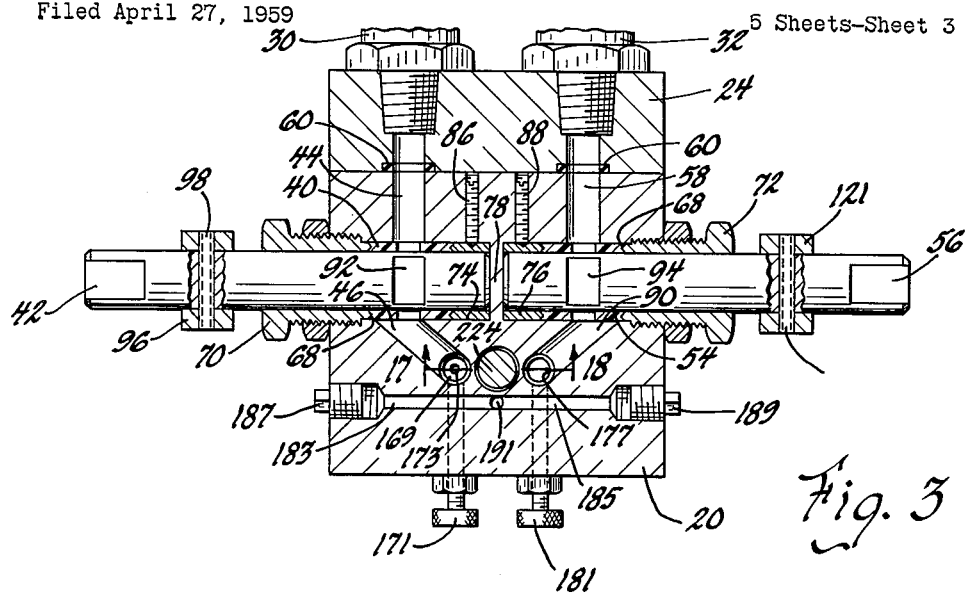
FIGURE 3 is a sectional view taken along the line 3—3 of FIGURE 1.
Figure 4:
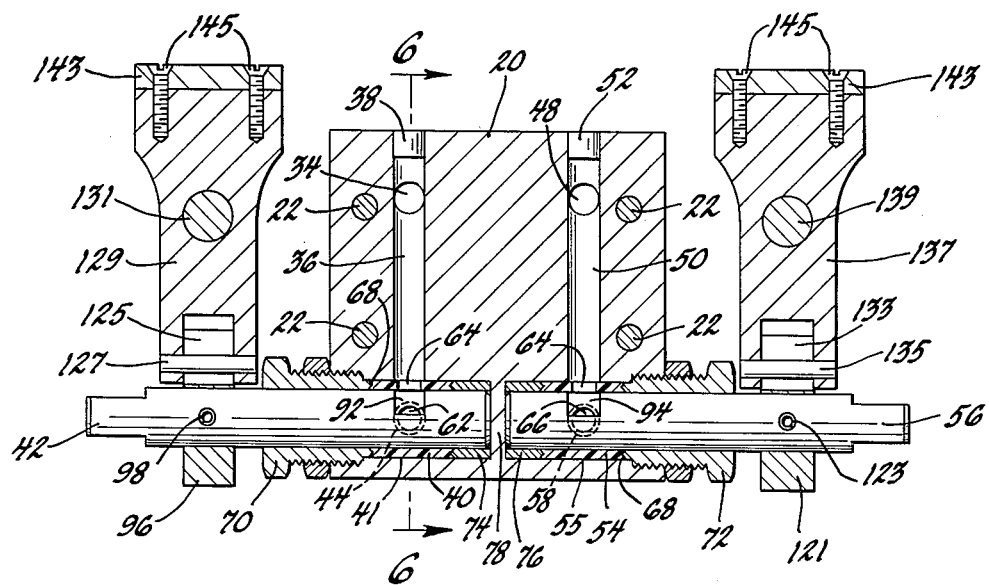
FIGURE 4 is a sectional view taken along the line 4—4 of FIGURE 2.

Referring now to the drawings and more particularly to FIGURES 1, 2 and 16, there is shown a chemical fluid mixer embodying one form of my invention. This mixer includes a valve housing 20 in the form of a rectangular metal block to which is fastened by the screws or bolts 22 a face plate 24 provided with four fluid connections 26, 28, 30 and 32.

This mixer is termed the on/off type mixer since during the off period the two components merely recirculate while during the on period the two components are fed separately to the mixing head. In this operation one of the components, for example, the prepolymer component, is continuously fed through a flexible conduit to the fitting 26 threaded into the base plate 24 connecting directly to the horizontal passage 34 in the face plate 24 and the housing 20. The passage 34 connects directly with the vertical passage 36 closed at the top by the plug 38 and connecting at the bottom with the valve cage 40 fitting tightly in the left bore 41 extending inwardly from the left face of the housing 20 to the wall 78. The rotary valve 42 within the valve cage is turned as shown in FIGURE 7 so that its arcuate notch 92 is turned to a 45° angle at all times when the mixer is in the off position. This provides continuous recirculation back through the passage 44, through the block 20 and the face plate 24 to the connection 30 connecting with the prepolymer recirculating system. In the on position of the valve 42 as shown in FIGURE 8, it is turned 90° at all times so that its arcuate notch 92 is in the opposite 45° position to connect the passage 36 with a passage 46 connecting with the mixing chamber.

The nipple or threaded connection 28 is in the catalyst or resin circuit and provides a connection from the catalyst or resin recirculating supply system to the passage 48 extending through the face plate 24 and the housing 20. It connects with a vertical passage 50 plugged at the top by a plug 52 and connecting at the bottom with the valve cage 54 within which is the valve shaft 56. The valve cage 54 fits tightly within the right bore 55 extending inwardly from the right face of the housing 20. When the mixer is in the off position, the valve shaft 56 is turned to a position similar to FIGURE 7 to place the arcuate notch 94 therein at the 45° angle to cause the catalyst or resin component to be returned through the passage 58 to the threaded connection or nipple 32 connecting with the flexible return conduit of the catalyst or resin recirculation system. Thus in this arrangement each of the components recirculate by virtue of the position of the valves and their arcuate notches 92, 94 corresponding to FIGURE 7 whenever the mixer is in the off position. The two components are merely given as examples of two reactive chemical liquids or fluids which may be mixed by this chemical mixer.

The face plate 24 has recesses surrounding the passages containing O ring seals 60 of suitable elastomeric material for preventing leakage of the components through the joint between the face plate and the housing 20. The valve cages 40 and 54 are identical and are made of polytetrafluoroethylene. Each is in the form of a cylinder having three apertures 62, 64 and 66 located 90° apart. As shown in FIGURE 9, the right face is provided with an annular V-shaped groove 68 for receiving the complimentary projecting end of either of the gland nuts 70 or 72. The gland nuts are each provided with a lock nut. The gland nuts force the valve cages 40 and 54 firmly into contact with the middle metal bearings 74 and 76 which are separated by the separating wall 78 which also separates the inner ends of the valve shafts 42 and 56 so that no leakage between the components is possible.

The ends of the valve cages 40 and 54 opposite the V groove 68 are provided with six uniformly spaced recesses 80 which are adapted to receive the three complimentary projections 82 projecting from the adjacent end of the bearings 74 and 76. The purpose of this arrangement is to allow the bearings 74 and 76 and the valve cages 40 and 54 to be identical and yet properly oriented. The orientation is initially determined by the notches 84 in the bearings 74 and 76 held in identical relationship by the pointed set screws 86 and 88. The six recesses 80 in the valve cages 40 and 54 allow these cages 40 and 54 to be oriented so that the three apertures therein corresponding to the apertures 62, 64 and 66 are properly oriented with the vertical passages 36 and 50, the rearward passages 44 and 58 and the supply passages 46 and 90. The valve shaft 42 is provided with a notch 92 for making the connection between the vertical passage 36 and either of the passages 44 or 46 while the valve shaft 56 is provided with a notch 94 for providing communication between the vertical passage 50 and either of the passages 58 or 90. In this arrangement, the gland nuts 70 and 72 force the valve cages 40 and 54 tightly against the bearings 74 and 76 and prevent leakage of the components from the block 20 while the separating wall 78 prevents leakage of either of the components into the other within the block 20.

The valve shaft 42 has pinned to it the arm 96 by a self-locking spring pin 98. Similarly the valve shaft 56 has pinned to it the arm 121 by a self-locking spring pin 123. The arm 96 has at its upper end a slot 125 which receives the pin 127 at the lower end of the follower 129 threaded onto the piston rod 131 of the double acting air cylinder 132. The arm 121 has a slot 133 receiving the pin 135 at the lower end of the follower 137 threaded onto the piston rod 139 of the double acting air cylinder 141. Lock nuts may be provided upon the ends of the piston rods 131 and 139 as shown to lock the followers 129 and 137 thereto. The air cylinders 132 and 141 are supported by the transverse mounting plate 262.

The followers 129 and 137 extend into rectangular grooves upon the opposite ends of the yoke 143. They are fastened to the yoke by the screws 145. This insures that the pistons and piston rods, 131 and 139, the yoke 143, the arms 96 and 121 and the valve shafts 42 and 56 will operate simultaneously. The use of the two air cylinders 132 and 141 insures adequate power and uniformity of the torque action to the valve shafts 42 and 56.

The front ends of the cylinders 132 and 141 are connected by the conduits 147 and 149 and the common conduit 151 with the dual two way valve 153. The conduits 155 and 157 connect the rear of the cylinders 132 and 141 with the common connection 159 connecting with a dual double acting valve 153. The valve 153 is a dual piston type valve providing a connection of the conduits 151 and 159 alternately with either the air supply conduit 161 or the exhaust conduit 163. The valve 153 is operated to the left to supply air from the supply conduit 161 to the conduits 151, 147 and 149 by the electromagnet 165 while the conduit 159 is connected to the exhaust conduit 163. The valve 153 is operated by the electromagnet 167 to the right to connect the air supply 161 with the conduits 155, 157 and 159 while the conduit 151 is connected to the exhaust 163. This insures that the valves of the mixer will always be either in the full off position or the full on position. The intermediate position shown in FIGURES 1 to 6 has been selected for convenience in illustration and does not represent a stationary position.

The passage 46 extends to an orifice bushing 169 of stainless steel held in place by the knurled set screw 171 provided with a suitable lock nut. The orifice bushing 169 has a restricted outlet orifice 173 for properly metering the flow of the prepolymer component into the interior of the mixing cylinder or casing 175. The second orifice bushing 177 is provided for metering the flow of the catalyst or resin component into the mixing cylinder 175. This orifice bushing has a much larger orifice 179 to provide a proper ratio between the flow of the catalyst or resin component as compared to the flow of the prepolymer through the orifice 173. The orifice bushing 177 is locked in place by the set screw 181 provided with a suitable lock nut. The block 20 is also provided with lubricant passages 183 and 185 normally closed by the plugs 187 and 189. These horizontal lubricant passages connect with the vertical lubricant passage 191 extending into the interior of the cylinder 175. The lubricant normally used after a stoppage is tricresylphosphate which is injected into either of the passages 183 or 185 after removal of either of the plugs 187 or 189.

A flexible cable drive shaft 220 connects through the nipple 222 with the shaft 224 mounted upon the ball bearings 226 and 228 within the cylinder 230. The cylinder 230 is held tightly within a bore in the housing 20 by the cover plate 232. The reduced and tapered lower end of the spindle 224 is threaded into the hollow mixing head 234 having a plurality of irregular mixing grooves 236 for mixing the components together within the cylinder 175. The cylinder 175 has an external upper flange 238 held by the reduced threaded portion of the gland nut 240 threading into the socket plate 242 fastened to the housing 20 by screws not shown. The bottom of the cylinder 175 is provided with a small external bead for holding the nozzle cylinder 244 in such a manner that it extends downwardly far enough to prevent the mixed components from being thrown out centrifugally. The cylinder 244 therefore acts as a sort of nozzle to direct the flow of the mixed components downwardly into the mold or cavity into which it is desired that they be deposited.

The gland nut 240 operates as a quick release arrangement to prevent breakage of the flexible shafting 220 in the event that the mixing head 234 binds within the cylinder 175 due to presence of solidified mixed components between the mixing head 234 and the cylinder 175 or any other reason. The gland nut 240 is arranged so as to unscrew in the event that there is binding or a large drag between the mixing head 234 and the cylinder 175. Any abnormal torque upon the cylinder 175 will cause both it and the gland nut 240 to turn in the direction to unscrew the gland nut 240 from the member 242 to allow the cylinder 175 to turn with considerable ease. The amount of unscrewing of the nut 240 and the releasing of the cylinder 175 is limited by the projecting knurl screw 246 which projects to engage the fixed stop 248 whenever the nut 240 is rotated three-quarters of a turn. The gland nut 240 is provided with eight threaded apertures 250 into any one of which can be threaded the screw 246 so that the unscrewing of the nut 240 will be limited to about three-quarters of a turn by its engagement with the stop 248. This prevents the gland nut 240 from becoming completely unscrewed, but releases the cylinder 175 sufficiently to allow it to rotate with the gland nut 240 serving as a bearing, and therefore accidents are prevented.

At the conclusion of any usage, it is necessary to clean the mixing cylinder 175, the mixing head 234 and parts thereof. The gland nut 240 is readily removed by unscrewing it thereby permitting the removal of the cylinder 175 and the cylinder 244 for ease of cleaning. To unscrew the mixing head 234, there is provided in the housing a spring-pressed plunger 252 held within the threaded sleeve 254 threaded into the mounting plate 262. This plunger 252 is provided with a pin 256 which may be pressed into one of the recesses 258 in the enlarged portion of the spindle shaft 224 to prevent its rotation while the mixing head 234 is being unscrewed from the spindle shaft 224.

The mixing head is suitable for continuous and intermittent use providing the mixing chamber is cleaned following any stoppage. The orifices 173 and 179 insure proper proportioning of the ingredients. The valve cages 40 and 54 fit the bores in the block 20 and the valve shafts 42 and 56 with sufficient tightness to prevent leakage into the mixing chamber or to the outside. The imperforate wall 78 between the inner ends of the valve shafts 42 and 58 prevents leakage of one component into the other within the housing. The ring seals 60 likewise prevent leakage of one component into the other at the joint between the face plate 24 and the housing 20. The face plate 24 may be quickly disconnected from the housing 20 by removing the screws or bolts 22 so as to quickly replace the housing 20 with a different housing which may have differently proportioned orifices or different other arrangements.

While the embodiment of the present invention as herein disclosed, constitutes a preferred form, it is to be understood that other forms might be adopted.

What is claimed is as follows:

1. Apparatus for mixing material such as polyurethane foam or the like including a mixing member and a casing member surrounding the mixing member, means for supporting one of said members in fixed relationship relative to the other of said members, means for rotating said other member in one direction, means for introducing the material to be mixed between said members, and means interposed between said one member and said supporting means for holding said one member in fixed relationship to said supporting means and automatically responsive to abnormal torque upon said one member during the rotation of said other member in said one direction for releasing said one member for rotation with said other member whereby to prevent damage to said means for rotating.

2. The apparatus of claim 1 wherein said interposed means is a nut having threads in engagement with said supporting means, said nut being threadedly releasable in said one direction.

3. The apparatus of claim 2 including means to limit the threadedly releasable movement of said nut relative to said supporting means.

References Cited in the file of this patent

UNITED STATES PATENTS

| | | |
|---|---|---|
| 858,321 | Anchu | June 25, 1907 |
| 1,960,843 | Gilbert | May 29, 1934 |
| 2,295,111 | Hemmings | Sept. 8, 1942 |
| 2,716,555 | Rowe | Aug. 30, 1955 |
| 2,868,518 | Corby et al. | Jan. 13, 1959 |
| 2,894,732 | Taber et al. | July 14, 1959 |

OTHER REFERENCES

Ind. & Eng. Chem., vol. 42, No. 5 (1950) (Corrosion-Fontana), pages 65A–66A.